United States Patent
Vaderna et al.

(10) Patent No.: US 11,050,609 B2
(45) Date of Patent: Jun. 29, 2021

(54) TECHNIQUE FOR REPORTING AND PROCESSING ALARM CONDITIONS OCCURRING IN A COMMUNICATION NETWORK

(71) Applicant: Telefonaktiebolaget LM Ericsson (publ), Stockholm (SE)

(72) Inventors: Peter Vaderna, Budapest (HU); László Hévizi, Piliscsaba (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 196 days.

(21) Appl. No.: 15/780,350

(22) PCT Filed: Dec. 9, 2015

(86) PCT No.: PCT/EP2015/079147
§ 371 (c)(1),
(2) Date: May 31, 2018

(87) PCT Pub. No.: WO2017/097356
PCT Pub. Date: Jun. 15, 2017

(65) Prior Publication Data
US 2018/0359137 A1    Dec. 13, 2018

(51) Int. Cl.
*G06F 15/173* (2006.01)
*H04L 12/24* (2006.01)

(52) U.S. Cl.
CPC ...... *H04L 41/0622* (2013.01); *H04L 41/0609* (2013.01); *H04L 41/0631* (2013.01)

(58) Field of Classification Search
CPC .............. H04L 41/0622; H04L 41/069; H04L 41/0609; H04L 41/0631; H04L 41/06; H04L 41/0604; H04L 41/046
(Continued)

(56) References Cited

U.S. PATENT DOCUMENTS 5,913,036 A * 6/1999 Brownmiller ............ H04J 3/14
340/3.1
8,804,492 B2   8/2014 Bertze et al.
(Continued)

FOREIGN PATENT DOCUMENTS

EP      2894813 A1    7/2015
WO   2001098916 A1   12/2001

*Primary Examiner* — Johnny B Aguiar
(74) *Attorney, Agent, or Firm* — Coats + Bennett, PLLC

(57) ABSTRACT

A technique for reporting and processing alarm conditions in a communication network is disclosed. In one variant, a network element is presented that comprises a memory and at least one processor coupled to the memory, wherein the memory stores program code that configures the at least one processor to detect, as a first event, at least one alarm condition and to start, in response to detecting the first event, an alarm clearance timer. The program code further configures the at least one processor to detect, as a second event, at least one of expiry of the alarm clearance timer and clearance of the at least one alarm condition and to determine, after detecting the second event, a first performance indicator value of a performance indicator for a first period of time between the first event and the second event. The at least one alarm condition and the first performance indicator value (or information derived from the first performance indicator value) are then reported to a central network management component.

16 Claims, 11 Drawing Sheets

(58) Field of Classification Search
USPC .................................................. 709/223, 224
See application file for complete search history.

(56) References Cited

U.S. PATENT DOCUMENTS

| | | | |
|---|---|---|---|
| 2004/0059807 A1* | 3/2004 | Klotz | H04L 41/12 |
| | | | 709/223 |
| 2004/0105416 A1* | 6/2004 | Rue | H04L 67/1002 |
| | | | 370/338 |
| 2009/0028553 A1* | 1/2009 | Oron | H04Q 11/0067 |
| | | | 398/25 |
| 2010/0027432 A1* | 2/2010 | Gopalan | H04L 41/142 |
| | | | 370/252 |
| 2010/0057901 A1* | 3/2010 | Ozaki | H04L 43/50 |
| | | | 709/223 |
| 2010/0094990 A1* | 4/2010 | Ben-Yehuda | G06F 11/3409 |
| | | | 709/224 |
| 2012/0030511 A1* | 2/2012 | Wylie | G06F 11/1076 |
| | | | 714/15 |
| 2012/0163194 A1* | 6/2012 | Bertze | H04L 41/0654 |
| | | | 370/242 |
| 2013/0176858 A1* | 7/2013 | Zee | H04L 41/0631 |
| | | | 370/241 |
| 2015/0195154 A1 | 7/2015 | Hévizi et al. | |
| 2018/0004589 A1* | 1/2018 | Liu | H04L 41/0654 |

* cited by examiner

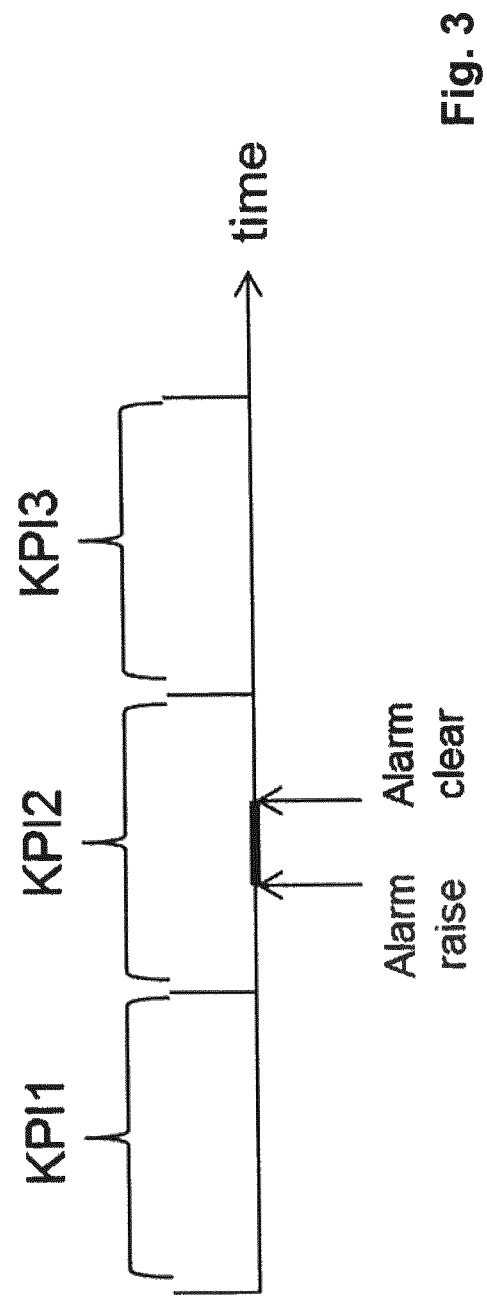

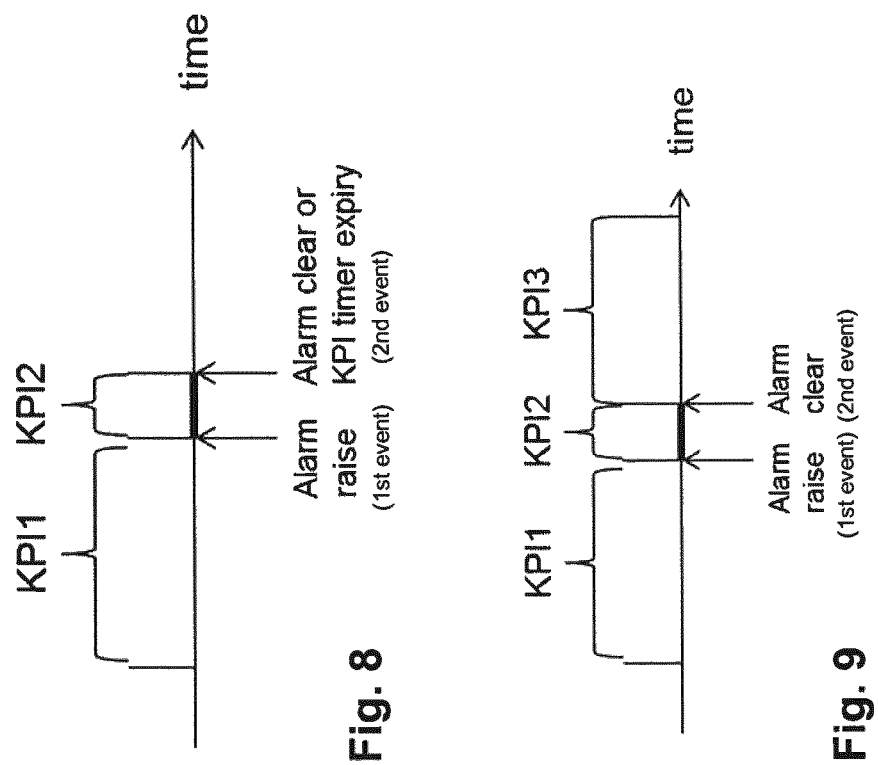
Fig. 8
Fig. 9
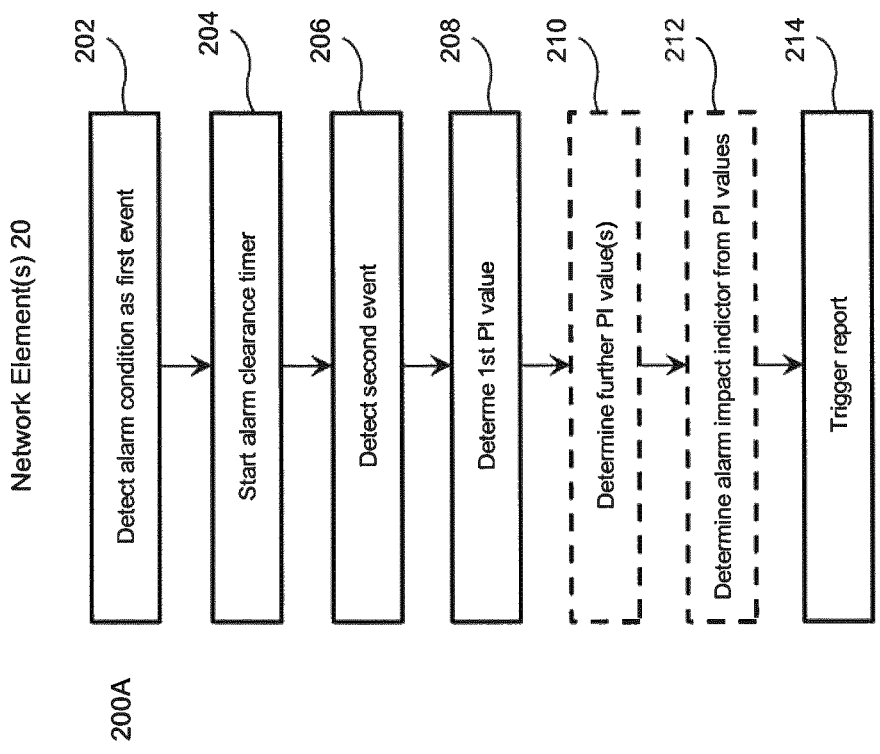
Fig. 7

Fig. 14

| Timestamp | User ID | event record |
|---|---|---|
| 1440342000 | 10001 | DL traffic volume: 1024; UL traffic volume: 2048; timeframe: 1s |
| 1440342000 | 10001 | Measured RSRP: -96.5; Measured RSRQ: -8.4; timeframe: 1s |
| 1440342001 | 10002 | S1 handover result: SUCCESSFUL; source cell: 1233; target cell: 1234 |
| ... | ... | ... |

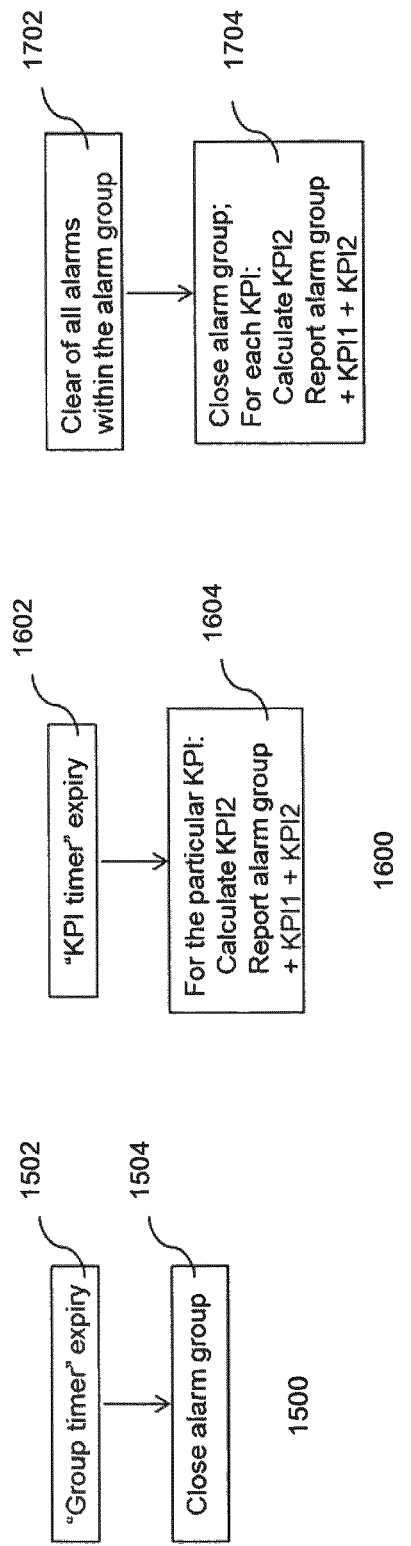

TECHNIQUE FOR REPORTING AND PROCESSING ALARM CONDITIONS OCCURRING IN A COMMUNICATION NETWORK

TECHNICAL FIELD

The present disclosure generally relates to network failure management. In more detail, a technique for reporting and processing alarm conditions occurring in a communication network is disclosed. The technique can be implemented in the form of devices, methods, computer programs and systems.

BACKGROUND

The complexity of modern communication networks makes the networks vulnerable to a plethora of different failures. Such failures include hardware or software failures, power outages, link failures and protocol failures, to name a few. It is therefore evident that an efficient failure management is essential for communication networks.

There exist various approaches for network failure management. In some implementations, individual network elements within the communication network are configured to raise an alarm upon local detection of an alarm condition, such as a particular failure. Alarm conditions detected by multiple network elements are reported to a central network management component for further processing. Such further processing typically includes determining a particular network problem, identifying its root cause and fixing that root cause.

FIG. 1 illustrates an exemplary scenario in which the alarm conditions detected by individual Network Elements (NEs) of a communication network are reported to a central network management component in the form of an Operations and Maintenance (O&M) entity. Other examples of such network management components include an Operations Support System (OSS) and a Network Operations Center (NOC). FIG. 2 illustrates an exemplary network element that can be utilized in the scenario of FIG. 1.

As shown in FIGS. 1 and 2, the network elements are configured to detect alarm conditions and report the alarm conditions in associated alarm streams to the central management component. Moreover, the network elements may also report selected events (which need not be failures but could also be measurements or other aspects that relate to a regular network element operation). Still further, so called performance indicators for the communication network can be reported by the network elements. All of these items of information can be aggregated prior to reporting.

Performance indicators, in some cases also referred to as Key Performance Indicators (KPIs), are calculated by the network elements as aggregations of individual measurements over certain periods of time ("aggregation periods"). For a particular performance indicator, the aggregation period is typically fixed. Depending on the use case, there may be several levels of performance indicator aggregation prior to reporting of the overall aggregate to the network management component.

Based on the reported information, the network management component performs alarm-related processing operations. As shown in FIG. 1, such processing operations include grouping of reported alarms (e.g., in regard of an individual root cause), determining an alarm impact, prioritizing the reported alarms or alarm groups (e.g., based on their impact), and determining the root cause for an individual alarm or alarm group (e.g., in an order defined by the associated priority).

Due to the large number of events and alarm conditions potentially occurring at a typical network element, the underlying data need to be filtered and aggregated before being reported to the network management component (via a suitable interface such as an O&M interface in the scenario of FIG. 2). Since the alarm stream is, especially for less complex network elements, not a heavy data source, the alarm conditions may in certain cases be reported without filtering and aggregation.

One major challenge with handling alarm streams by the central network management component is that the network elements generate and report the alarms in an uncoordinated manner. Moreover, in many cases multiple alarms are reported by the same or different network elements for the same root cause. As a result, the central management component often becomes flooded with alarms. The resulting flood of alarms can be difficult to handle within a given period of time. It is therefore necessary to properly prioritize the reported alarms.

Alarm prioritization may, for example, be based on the performance indicators that are reported in a close temporal context with the alarms (see FIGS. 1 and 2). In other words, the network management component can process one or more performance indicators it can associate (i.e., correlate) with one or more reported alarms and derive an estimate for the severity of an underlying network problem from the performance indicators. Alarms for which a severe network problem has been identified can then be processed in a prioritized manner.

It has in practice been found that the failure-related information reported by network elements in many cases does not yet permit a satisfactory failure management by the network management component. As an example, the processing of reported alarm conditions by the network management component is often performed in a sub-optimal order, which means that severer network problems can only be addressed with an unnecessary delay.

SUMMARY

Accordingly, there is a need for an alarm condition reporting and processing technique that avoids one or more drawbacks of prior art solutions.

According to a first aspect, a network element comprising a memory and at least one processor coupled to the memory is provided, wherein the memory stores program code that configures the at least one processor to detect, as a first event, at least one alarm condition and to start, in response to detecting the first event, a first alarm clearance timer. The program code further configures the at least one processor to detect, as a second event, at least one of expiry of the first alarm clearance timer and clearance of the at least one alarm condition, and to determine, after detecting the second event, a first performance indicator value of a performance indicator for a first period of time between the first event and the second event. The program code further configures the at least one processor to trigger reporting of the at least one alarm condition and of at least one of the first performance indicator value and information derived from the first performance indicator value.

It will be appreciated that the first event, the second event, and so on, as used herein, will typically be different from the reported events (e.g., measurements) discussed above with reference to FIGS. 1 and 2. It will further be appreciated that the at least one alarm condition detected as the first event will generally be related to a failure detected by the network element. The at least one alarm condition may thus be reported as an alarm (e.g., using a regular alarm reporting format) to a higher-level entity (such as a network management component).

As explained above, at least one of expiry of the first alarm clearance timer and clearance of the at least one alarm condition may be detected as the second event. In certain variants, the network element may concurrently monitor expiry of the first alarm clearance timer and clearance of the at least one alarm condition and detect the second event as the first one of expiry of the first alarm clearance timer and of clearance of the at least one alarm condition. In such a case, the second event may thus be detected upon expiry of the first alarm clearance timer even if the at least one alarm condition has not yet been cleared, and vice versa.

The first period of time may in one implementation start with detection of the first event and end with detection of the second event. In some variants, the network element may further be configured to trigger reporting of the first period of time (e.g., in association with the first performance indicator value or the information derived therefrom).

The program code may further configure the at least one processor to determine at least a second performance indicator value for the performance indicator. The second performance indicator value may be determined for a second period of time preceding the first event.

For determination of the second performance indicator value, the program code may further configure at least one of the at least one processor and the memory to buffer data suitable for determining second performance indicator value. The second performance indicator value may thus be determined from the buffered data.

The program code may further configure the at least one processor to determine at least a third performance indicator value for the performance indicator. The third performance indicator value may be determined for a third period of time following the second event.

Each of the first, the second and the third performance indicator value will thus be determined for one and the same performance indicator. Of course, one or more further performance indicator values may be determined for one or more further performance indicators. In such a case, reporting of the one or more further performance indicator values, or of information derived from the one or more further performance indicator values, may also be triggered by the network element.

The at least one alarm condition may be reported together with the first performance indicator value and/or the information derived from the first performance indicator value (e.g., in a single report message). Alternatively, the at least one alarm condition and at least one of the first performance indicator value and the information derived from the first performance indicator value may be reported separately at different points in time. As an example, the at least one alarm condition may be reported as soon as it can be detected as the first event (and, e.g., before the second event). The first performance indicator value and/or the information derived therefrom, on the other hand, may only be reported after the second event (e.g., in response to detecting the second event).

The program code may further configure the at least one processor to set a duration of at least one of the second period of time and the third period of time to a particular duration. That particular duration may be the first period of time, a setting of the first alarm clearance timer, or a regular measurement aggregation period for the particular performance indicator.

The program code may further configure the at least one processor to also trigger reporting of at least one of the second performance indicator value and the third performance indicator value. These one or more further performance indicator values may be reported together with the first performance indicator value (e.g., within a single report message) or separately at different points in time.

The program code may further configure the at least one processor to determine an alarm impact indicator from at least the first performance indicator value and one or both of the second performance indicator value and the third performance indicator value. In some cases, the information derived from the first performance indicator value may correspond to the alarm impact indicator. The alarm impact indicator may be reported also (e.g., together with the at least one alarm condition in a single report message).

In some cases, the alarm impact indicator may reflect a change, or difference, of the performance indicator from regular operation (e.g., during the second period of time) to faulty operation (e.g., during the first period of time) and/or from faulty operation to regular operation after recovery from the failure (e.g., during the third period of time). Two or more alarm impact indicators may be determined for a particular alarm condition (e.g., a first one for the change from regular operation to faulty operation and a second one for the change from faulty operation to regular operation after failure recovery).

The performance indicator may take any form. In particular, the performance indicator may constitute information typically generated in connection with Performance Management (PM). As an example, the performance indicator may be derived from aggregated measurements (e.g., of a particular performance metrics). Measurement aggregation may be performed for measurements taken over a particular period of time to obtain a particular performance indicator value. As an example, the measurements aggregated over the first period of time may form the basis of the first performance indicator value (and in a similar manner for the second and third performance indicator values).

The program code may further configure the at least one processor to set the first alarm clearance timer to a first alarm clearance timer value. That first alarm clearance timer value may correspond to maximum expected lifetimes of possible alarm conditions detectable by the network element. The first alarm clearance timer value could be set from 1 min to 1 day (e.g., from a few minutes to a few hours).

The first alarm clearance timer value may be customized to particular alarm conditions and/or particular performance indicator types.

In certain variants, the network element may be capable of building alarm condition groups. As such, the program code may further configure the at least one processor to start, in response to detecting the first event, an alarm grouping timer. The alarm grouping timer may be set to an alarm grouping timer value. That alarm grouping timer value may correspond to an estimated period of time in which alarm conditions resulting from a common root cause occur. In general, the alarm grouping timer value could range between 1 sec and 10 mins (e.g., between 5 sec to 5 mins). The alarm grouping timer value may be customized to the particular network element type on which the alarm grouping timer is deployed.

The program code may further configure the at least one processor to detect, as a third event, a further alarm condition while the alarm grouping timer and the first alarm clearance timer are running. In response to detecting the third event, at least one of the first alarm clearance timer and the alarm grouping timer may be re-started. Optionally, the second event may be detected upon all alarm conditions occurred while the alarm grouping timer is running having been cleared or the first alarm clearance timer having expired (e.g., whatever happens first).

The program code may further configure the at least one processor to detect, as a fourth event, expiry of the alarm grouping timer and to prevent, in response to detecting the fourth event, a re-start of the first alarm clearance timer while the first alarm clearance timer is running. In such a case, a fifth event may be detected as a further alarm condition while the first alarm clearance timer is still running. In response to detecting the fifth event, a second alarm clearance timer running in parallel to the first alarm clearance may be started.

The at least one alarm condition may be reported in various forms. As an example, the at least one alarm condition may be reported in the form of at least one of an alarm identifier, an alarm duration (e.g., as defined by the first period of time), and an identifier of the network element. The alarm condition may be reported as alarm in a regular alarm report format as defined in any applicable standard.

According to a further aspect, a network management component comprising a memory and at least one processor coupled to the memory is provided, wherein the memory stores program code that configures the at least one processor to process an alarm condition reported by a network element. The program code further configures the at least one processor to process at least one of a first performance indicator value for a performance indicator and information derived from the first performance indicator value, as reported by the network element. The first performance indicator value relates to a first period of time between a first event and a second event at the network element, wherein the first event is detection of the alarm condition and the second event is at least one of expiry of an alarm clearance timer at the network element and clearance of the alarm condition.

The alarm condition on the one hand and the first performance indicator value and/or the information derived therefrom on the other hand may be received via a single report message or in different report messages (and, thus, at different points in time). The corresponding one or more report messages may be received via a dedicated interface of the network management component. The network management component may be in charge of multiple network elements that report their alarm conditions and associated performance indicator value information to the network management component.

In certain variants, the program code configures the at least one processor of the network management component to process at least one of a second and a third performance indicator value for the performance indicator. The second performance indicator value may relate to a second period of time preceding the first event. The third performance indicator value may relate to a third period of time following the second event. In such a case, the network management component may be configured to determine an alarm impact indicator from at least the first performance indicator value and one or both of the second performance indicator value and the third performance indicator value.

The memory of the network management component may further store program code that configures the at least one processor to process an alarm impact indicator reported by the network element. The alarm impact indicator may be an example of the information derived from the first performance indicator by the network element. As such, the alarm indicator may be based on the first performance indicator value and one or both of the second performance indicator value and the third performance indicator value.

The memory of the network management component may further store program code that configures the at least one processor to process multiple alarm conditions and related alarm impact indicators. As explained above, the alarm impact indicators may have also been reported by the network element(s) and/or may have been centrally determined by the network management component. The corresponding information may be processed in connection with a prioritization mechanism. As an example, a further processing (e.g., resolving or otherwise handling) of the alarm conditions by the network management component may be prioritized.

Also provided is a network system comprising the network management component presented herein as well as one or more of the network elements presented herein. The network management component may take the form of one or more of an O&M entity, an OSS and an NOC. The one or more network elements may belong to a communication network, such as a telecommunication network. In more detail, the network elements may constitute (e.g., managed objects of) one or more of a Radio Base Station (RBS), a Mobility Management Entity (MME), site routers, and so on.

According to a still further aspect, a method of operating a network element is provided. The method comprises detecting, as a first event, at least one alarm condition; starting, in response to detecting the first event, an alarm clearance timer; detecting, as a second event, at least one of expiry of the alarm clearance timer and clearance of the at least one alarm condition; and determining, after detecting the second event, a first performance indicator value of a performance indicator for a first period of time between the first event and the second event. The method further comprises triggering reporting of the at least one alarm condition and of at least one of the first performance indicator value and information derived from the first performance indicator value.

According to another aspect, a method of operating a network management component is provided, wherein the method comprises processing an alarm condition reported by a network element. The method further comprises processing at least one of a first performance indicator value for a performance indicator and information derived from the first performance indicator value, as reported by the network element. The first performance indicator value relates to a first period of time between a first event and a second event at the network element, wherein the first event is detection of the alarm condition and the second event is at least one of expiry of an alarm clearance timer and clearance of the alarm condition.

According to another aspect, a computer program product is provided comprising program code portions for performing the steps of any one of the methods and method aspects disclosed herein when the computer program product is executed on one or more computing devices. The computer program product may be stored on a computer-readable recording medium, such as a CD-ROM, DVD or semiconductor memory. Moreover, the computer program product may be provided for download via a communication network. In a still further variant, the computer program product may be provided in distributed manner on cloud computing resources.

BRIEF DESCRIPTION OF THE DRAWINGS

In the following, the present disclosure will be described in more detail with reference to exemplary embodiments illustrated in the drawings, wherein

FIG. 3 is a time diagram illustrating the setting of a measurement aggregation period for a performance indicator;

FIG. 7 shows a flow chart of a method embodiment performed by the network element of FIG. 4;

FIGS. 8, 9 show time diagrams illustrating the setting of a measurement aggregation period for a performance indicator in accordance with the present disclosure;

FIG. 14 shows an embodiment of an event record including measurements; and

FIGS. 15 to 17 show flow charts of further method embodiments in connection with the grouping of alarm conditions.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details. As an example, while several embodiments will be described in connection with certain standards and protocols of the $3^{rd}$ Generation Partnership Project (3GPP), it will be appreciated that the present disclosure can also be practiced in connection with other standards and protocols.

Those skilled in the art will further appreciate that the methods, steps and functions described herein may be implemented using individual hardware circuitry, using software functioning in conjunction with a programmed processor or general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in one or more processors and one or more memories coupled to the one or more processors, wherein the one or more memories store program code portions that perform the methods, steps and functions described herein when executed by the one or more processors.

Figure 2:
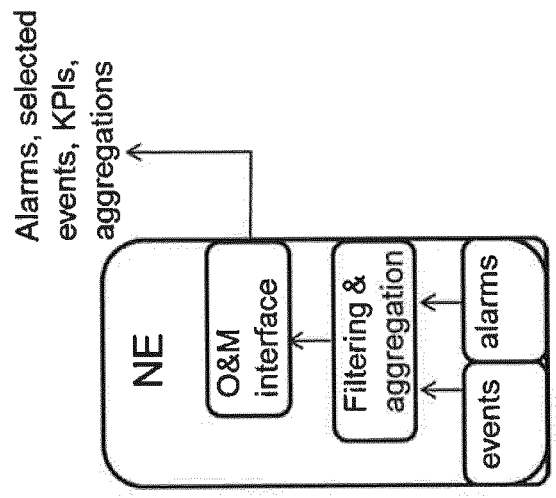
FIG. 2 shows a schematic drawing of a network element.

As has been explained above with reference to FIGS. 2 and 3, it is generally advantageous to implement a centralized approach for failure management in a communication network. Moreover, for an efficient management of alarm conditions reported by network elements to a central network management component, the reported alarm conditions have to be properly prioritized by the network management component. Such a prioritization ensures that alarm conditions associated with a potentially severer impact on the overall network performance can be addressed first.

The impact of an alarm condition can be determined as a network performance change and is typically derived by monitoring one or more performance indicators. A performance indicator is typically obtained by aggregating measurements for a predefined period of time (i.e., a predefined aggregation period).

FIG. 3 illustrates a time diagram with three subsequent aggregation periods (of the same, pre-set duration) for a particular performance indicator. The aggregated performance indicator measurements performed within one aggregation period form the basis for calculating an associated performance indicator value per aggregation period. FIG. 3 illustrates three exemplary aggregation periods and the associated performance indicator values, which are denoted by KPIi (for i=1, 2, 3).

In FIG. 3 it is exemplarily assumed that a failure occurs during the aggregation period in which the measurements for determining KPI2 are performed. In more detail, the network element determining (and reporting) the performance indicator values KPIi detects an alarm condition and clearance thereof during the aggregation period corresponding to KPI2.

The alarm condition that has occurred during the aggregation period for KPI2 will be reported together with KPI2 to the network management component. Assuming that the failure underlying the reported alarm condition correlates with the performance indicator for which KPI2 has been reported, the network management component may determine an impact of the alarm condition on network performance from KPI2.

As an example, KPI2 may be compared with one or both of the preceding performance indicator value (i.e., KPI1) and the subsequent performance indicator value (i.e., KPI3) to evaluate the change in network performance associated with the reported alarm condition. From this change the impact of the reported alarm condition can be determined. By comparing the impacts of different alarm conditions reported within a short period of time, the network management component may prioritize the processing of certain alarm conditions over other alarm conditions (e.g., in terms of root cause identification and fixing of the identified root cause).

It has been found that a correlation of alarm conditions and performance indicator values as illustrated in FIG. 3 does often not provide impact information that is accurate enough for prioritization or other processing purposes on the side of the network management component. Another drawback is the fact that an impact of the exemplary alarm condition illustrated in FIG. 3 based on KPI2 can only be determined with a certain delay as the measurement aggregation underlying KPI2 is still ongoing after the alarm condition has already been cleared.

It has further been found that these and other drawbacks can at least in part be overcome by synchronizing the period of time underlying determination of a particular performance indicator value with the lifespan (e.g., from detection to clearance) of an individual alarm condition or group of alarm conditions. Possible synchronization approaches will now be explained in more detail with reference to exemplary embodiments.

Figure 4:
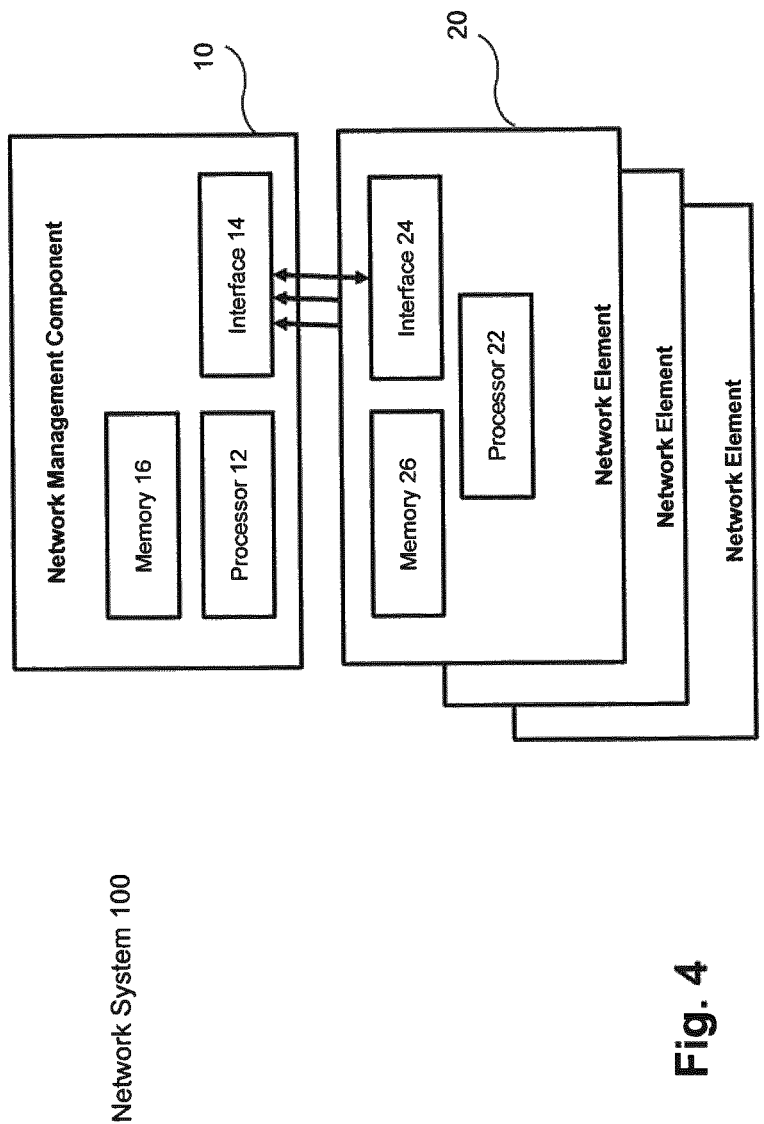
FIG. 4 shows an embodiment of a network system comprising a network management component and multiple network elements.

FIG. 4 illustrates an embodiment of a network system 100 comprising a network management component 10 and one or more network elements 20 in communication with the network management component 10. It will be appreciated that the network system 100 may comprise additional components not illustrated in FIG. 4.

The network elements 20 belong to a communication network and, in particular, a telecommunication network. The telecommunication network may comprise an access network domain as well as a core network domain. The one or more network elements 20 may be located in any of these domains. In one example, the one or more network elements 20 comprise an RBS within an access network domain and/or an MME within a core network domain.

Figure 1:
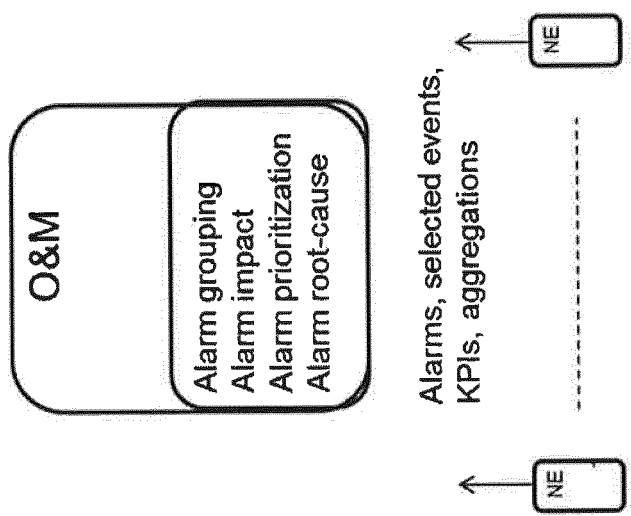
FIG. 1 shows a schematic drawing of a network management component.

From the perspective of failure management, each network element 20 will simply be considered as a component capable of reporting one or more of alarm conditions (e.g., via alarms), selected events, performance indicators and any aggregations thereof (as explained above with reference to FIG. 2). The network management component 10, in turn, will be configured to perform alarm-related processing operations, including one or more of alarm grouping, alarm impact determination, alarm prioritization and alarm root cause identification (as explained above with reference to FIG. 1). As such, the network management component 10 may take the form of an O&M entity, an OSS, an NOC, or any combination thereof.

The alarm-related operations performed by the network management component 10 and by the one or more network elements 20 of FIG. 4 may generally conform to a dedicated standard. In an exemplary 3GPP implementation, such standards in particular include 32.111-1 V12.2.0 "Fault Management; Part 1: 3G fault management requirements", 32.111-2 V12.2.0 "Fault Management; Part 2: Alarm Integration Reference Point (IRP): Information Service (IS)", and 32.111-6 V12.1.0 "Fault Management; Part 6: Alarm Integration Reference Point (IRP): Solution Set (SS) definitions".

As shown in FIG. 4, the network management component 10 comprises a processor 12 and an interface 14 configured to communicate with the one or more network elements 20. The network controller 10 further comprises a memory 16 with program code that, when executed by the processor 12, configures the network management component 10 to implement the methods and method aspects of the present disclosure (as will be explained in more detail below).

In a similar manner, each network element 20 comprises a processor 22, an interface 24 and a memory 26. The interface 24 is configured for communication with the network management component 10. The memory 26 stores program code that, when executed by the processor 22, configures the network element 20 to implement the methods and method aspects of the present disclosure (as will be explained in more detail below).

Figure 6:
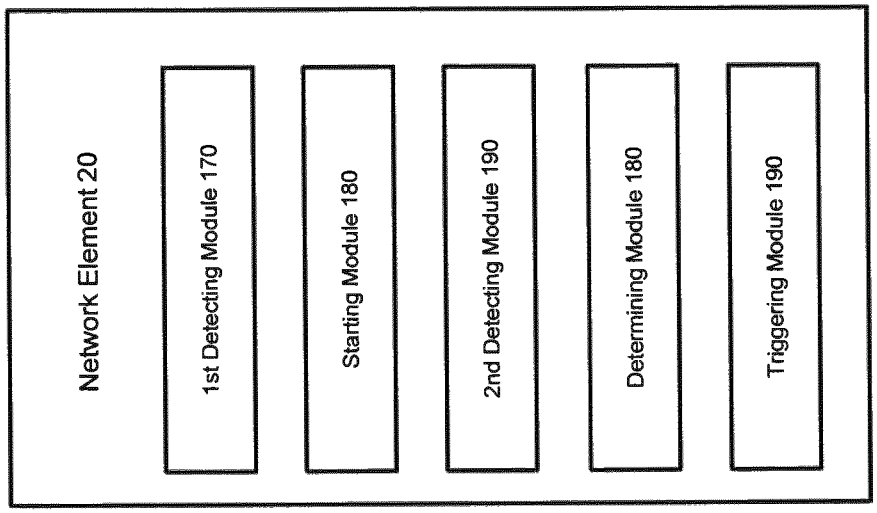
FIG. 6 illustrates a functional embodiment of one of the network elements of FIG. 4
Figure 5:
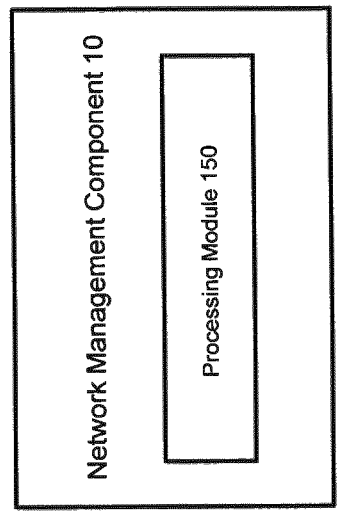
FIG. 5 illustrates a functional embodiment of the network management component of FIG. 4.

FIGS. 5 and 6 show functional embodiments of the network management component 10 and of one of the network elements 20, respectively. These functional embodiments may be based on the structural embodiments discussed above with reference to FIG. 1.

As illustrated in FIG. 5, the network management component 10 comprises a processing module 140. Referring to FIG. 6, the network element 20 comprises a first detecting module 150, a starting module 160, a second detecting module 170, a determining module 180 and a triggering module 190. The network management component 10 and the network element 20 may each comprise one or more further modules as needed.

FIG. 7 illustrates in a flow chart 200A an exemplary method embodiment performed by one of the network elements 20. The corresponding network element 20 may be configured as explained above with reference to FIGS. 4 and 6.

The method embodiment shown in FIG. 7 generally targets at synchronizing the determination and reporting of performance indicator values with the occurrence (e.g., the lifespan) of an alarm condition. As such, the comparison of proper and faulty operation periods can in some implementations become more accurate.

Moreover, in some implementations alarm impact assessment can be performed sooner and, in particular, may immediately follow alarm reporting. That assessment can in certain implementations be facilitated by a decentralized pre-processing of the information to be reported on a network element level.

With reference to FIG. 7, the network element 20 detects in step 202 an alarm condition as a first event. This detection may be performed by the corresponding detection module 150. The alarm condition can be any failure detectable by the network element 20, such as a software or hardware failure, a power outage, a link failure, a protocol failure, and so on.

In response to detecting the first event in step 202, an alarm clearance timer is started in step 204 (e.g., by the starting module 160). In general, the alarm clearance timer may be set to an alarm clearance timer value that corresponds to maximum expected lifetimes of possible alarm conditions detectable by the network element 20 (e.g., a few minutes to a few hours).

Then, in step 206, a second event is detected (e.g., by the corresponding detecting module 170). In more detail, the network element 20 continuously monitors both clearance of the alarm condition detected in step 202 and expiry of the alarm clearance timer. The second event is then detected as either timer expiry or alarm condition clearance, whatever happens first.

In a further step 208, a first value of at least one predefined performance indicator is determined for a first period of time between the first event and the second event (using, e.g., the determining module 180). That period of time may exactly span the period of time starting with detection of the first event and ending with detection of the second event, as shown in the time diagram of FIG. 8.

FIG. 8 illustrates that the period of time for performing the measurements to be aggregated for the purpose of determining a performance indicator value KPI2 exactly corresponds to the period of time spanning between detection of the alarm condition (i.e., raising of an alarm) and clearance of the alarm condition or expiry of the alarm clearance timer (denoted by "KPI timer" in FIG. 8). As such, the period of time underlying the determination of the performance indicator value KPI2 becomes synchronized with the lifespan of the alarm condition. The provision of the alarm clearance timer guarantees a well-defined reporting behavior in case a particular alarm condition cannot be cleared within a reasonable period of time.

The performance indicator value KPI2 determined in step 208, and/or information derived from that performance indicator value, may then be reported by the network element 20 to the network management component 10. To this end, the triggering module 190 may trigger a corresponding reporting operation in step 214.

Step 214 may further comprise triggering a reporting of the alarm condition detected in step 202. The alarm condition may, for example, be reported in the form of one or more of an alarm identifier, an alarm duration (e.g., as indicated by the duration between the first event and the second event), and an identifier of the network element 20 reporting the alarm condition. In one variant, also the nature of the second event may be reported by the network element 20. Accordingly, information may be reported that is indicative of at least one of alarm clearance timer expiry and alarm condition clearance. Additionally, or as an alternative, the duration of the period of time between the first and event and the second event may be reported. Corresponding information may then be taken into account by the processing operations performed by the network management component 10.

As illustrated by dashed lines in FIG. 7, the operational steps performed by the network element 20 could optionally include the determination of one or more further performance indicator values in step 210 and the determination of an alarm impact indicator from two or more of the performance indicator values that have been determined by the network element 20.

As shown in FIG. 8, a further performance indicator value KPI1 may be determined by the network element 20 for a period of time preceding the first event. As illustrated in FIG. 9, a still further performance indicator value KPI3 could be determined by the network element 20 for a period of time following the second event.

In the examples of FIGS. 8 and 9, the periods of time for which measurements are taken and aggregated for determining the further performance indicator values KPI1 and KPI3 correspond to the regular (e.g., pre-set) measurement aggregation period for the particular performance indicator (as illustrated in FIG. 3). The corresponding regular measurement aggregation period could be defined by an operator of the network management component 10 or in an applicable standard. In alternative embodiments, the periods of time underlying KPI1 and KPI3 could be defined to equal a setting of the alarm clearance timer or the aggregation period underlying KPI2.

In certain variants, one or both of the further performance indicator values KPI1 and KPI3 may also be reported in step 214. For example, KPI2 may be reported with one or both of KPI1 and KPI3 in a single report message.

In a further variant, the network element 20 determines in step 212 at least one alarm impact indicator from KPI2 and at least one of KPI1 and KPI3. As an example, the (e.g., a first) alarm impact indicator may be indicative of a network performance difference between a period of time preceding the first event and the period of time between the first event and the second event. Additionally, or alternatively, the (e.g., a second) alarm impact indicator may be indicative of a network performance difference between a period of time following the second event and the period of time between the first event and the second event. The one or more alarm impact indicators thus determined may be reported in step 214 instead of or in addition to KPI2. In other variants, the network management component 20 may itself calculate the alarm impact indicator(s) from the performance indicator values reported in step 214.

Figure 10:
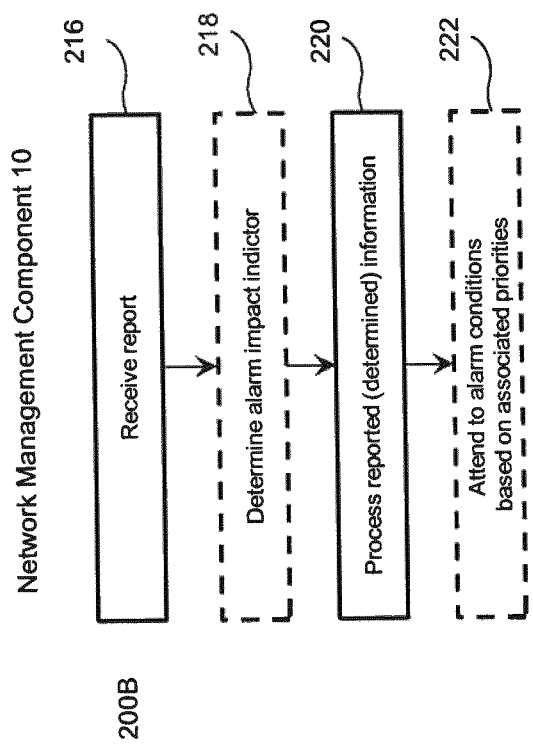
FIG. 10 shows a flow chart of a method embodiment performed by the network management component of FIG. 4.

FIG. 10 illustrates in a flow chart 200B an exemplary method embodiment performed by the network management component 10. The corresponding network management component 10 may be configured as explained above with reference to FIGS. 4 and 5.

In step 216, the network management component 10 receives from one or multiple network elements 20 one or multiple reports in accordance with the reporting step 214 discussed above with reference to FIG. 7. Accordingly, the network management component 20 will typically either receive multiple performance indicator values for a particular performance indicator or, in the alternative, at least one alarm impact indicator calculated by a particular network element 20 from these performance indicators values. Additionally, the network management component 10 will in step 216 receive information about one or multiple alarm conditions occurring at the reporting network element. In case the one or more alarm conditions are reported separately from the one or more performance indicator values or the alarm impact indicator(s), the network management component 10 receives further information, such as identifiers, from each reporting network element 20 to enable a correlation of alarm conditions and associated performance indicator values or associated alarm impact indicator(s).

In case the one or more alarm impact indicators are not yet reported by an individual network element 20 in step 214, the network management component 10 may itself determine the one or more alarm impact indicators from multiple reported performance indicator values in an optional step 218. In the exemplary embodiments illustrated in FIGS. 8 and 9, the alarm impact indicator(s) may thus, for example, be calculated in step 218 on the basis of KPI2 and one or both of KPI1 and KPI3.

In a further step 220, the network management component 10 processes the information reported in step 216 and, optionally, the alarm impact indicator(s) determined in step 218. Step 220 may be performed by the processing module 140 illustrated in FIG. 5. The processing in step 220 may concentrate on prioritizing individual alarm conditions (or individual groups of alarm conditions) based on their associated alarm impact indicators.

Then, in an optional step 222, the network management component 10 may attend to the individual alarm conditions based on the associated priorities. For example, one or multiple alarm conditions for which the associated alarm impact indicators signal a high network performance degradation may receive a high priority value in processing step 220. In step 222, such alarm conditions to which a high priority value has been attributed may then be handled before alarm conditions of lower priority values are considered.

Figure 11:
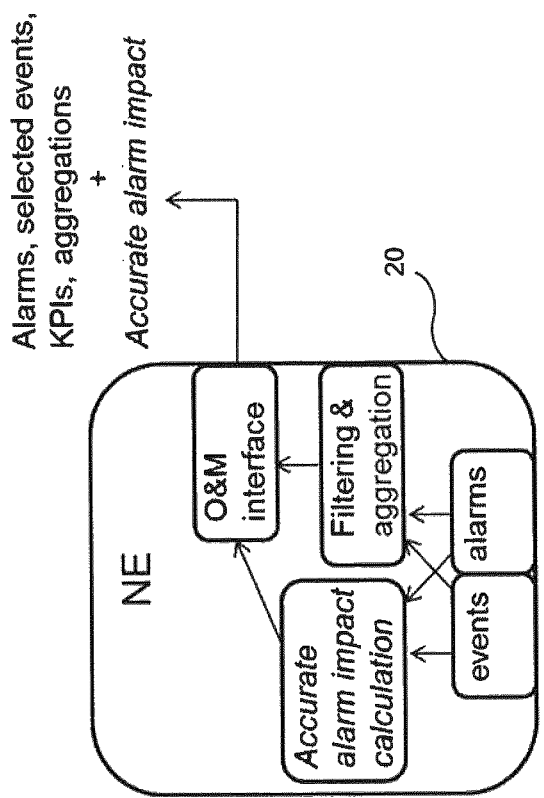
FIG. 11 shows a network element in accordance with a further embodiment.

FIG. 11 illustrates an embodiment of a network element 20 in accordance with the present disclosure. The embodiment is based on the network element shown in FIG. 2 and may be configured as discussed above with reference to FIGS. 4 and 6. As shown in FIG. 11, the network element may be configured to perform alarm impact calculations (e.g., to derive the alarm impact indicator(s) discussed above).

One significant difference compared to the prior art reporting of performance indicators illustrated in FIG. 3 is the fact that the network element 20 of FIG. 4 will report performance indicators that have been determined for a dedicated period of time during which an alarm condition was active (up to a maximum duration defined by a setting of the alarm clearance timer). This dedicated period of time has already been discussed above with reference to FIGS. 7, 8 and 9. Since the associated performance indicator value can be reported immediately after clearance of the associated alarm condition (and at the latest after expiry of the alarm clearance timer), the performance indicator value becomes available sooner than in a scenario illustrated in FIG. 3. Moreover, the associated performance indicator value will have more significance as it is not "diluted" by measurements performed during or after the lifetime of the alarm condition (see again FIG. 3).

As has been explained above with reference to steps 210 and 212 in FIG. 7, the network element 20 can further be configured to perform an accurate alarm impact calculation (as illustrated in FIG. 11), and the associated alarm impact indicator(s) can be communicated to the network management component 10. By performing the calculation of the alarm impact indicator(s) in a decentralized manner on the network element 20 on which the alarm conditions are detected, the processing load of the network management component 10 is reduced so that in essence the network management component 10 can quicker attend to alarm conditions (see step 222 in FIG. 10).

Specifically, centralized collection of measurements by the network management component 10 is cumbersome for some evident reasons. Additionally, also the measurements themselves load the network elements 20. For these reasons, operators sometimes switch-off the collection of certain performance indicators (e.g., in associated logs) in order to avoid the associated additional load. As a consequence, relevant performance indicators may not be readily available for impact evaluation after a particular failure. In view of such a scenario, an additional benefit of the technique presented herein is the fact that the reported (impact-related) performance indicators can be customized to individual alarm types (and might thus be different from "regularly" collected performance indicators, including counters). This approach guarantees that the actually relevant performance indicators for alarm impact evaluation will indeed be collected by the network elements 20 and processed there either locally or reported to the network management component 10 for calculating one or more alarm impact indicators.

In the embodiments described above it has been assumed that the processes are triggered by detection of individual alarm conditions. In alternative embodiments, individual alarm conditions (that presumably result from a common root cause) can be grouped into individual alarm condition groups (or, in brief, "alarm groups"). In such a case the lifespan of an alarm group as defined by an alarm grouping timer is defined separately from the expected lifespan of the alarm conditions attributed to that root cause (i.e., the setting of the alarm clearance timer, or KPI timer in FIG. 8). As such, two different timing mechanisms may run in parallel as will now be explained in more detail with reference to FIG. 12.

Figure 12:
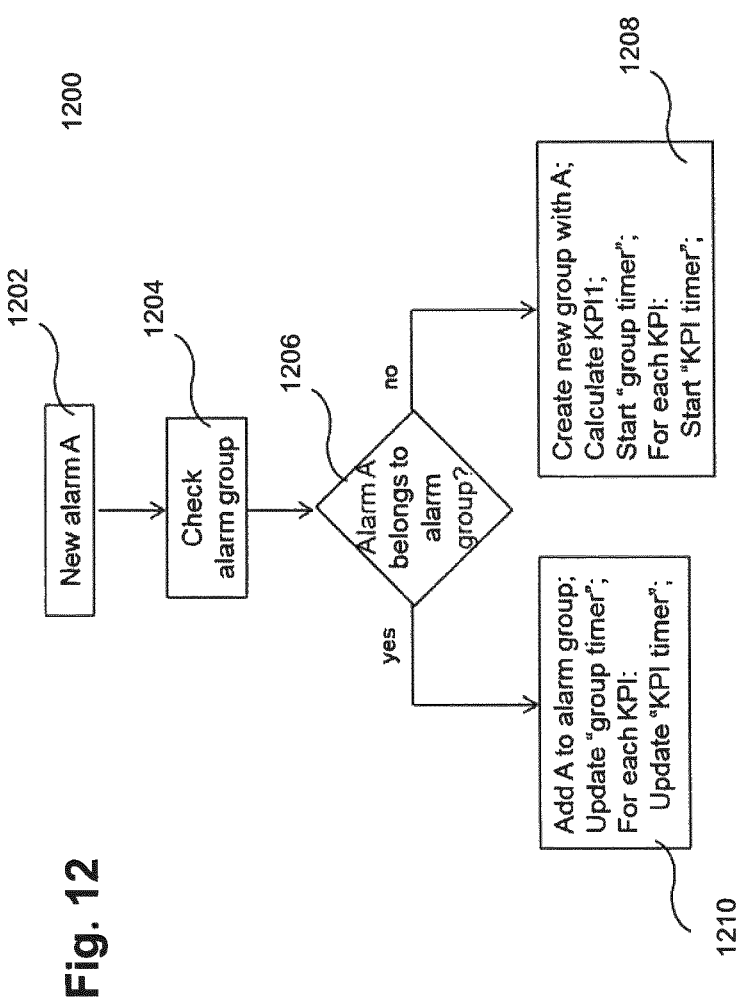
FIG. 12 shows a flow chart of an alarm condition grouping embodiment.

FIG. 12 illustrates a flow chart 1200 underlying an alarm grouping embodiment of the present disclosure. The alarm grouping timer will be set to an alarm grouping timer value that corresponds to an estimated period of time in which alarm conditions resulting from a common root cause occur (e.g., to a few seconds to a few minutes). Once the alarm grouping timer expires, the associated alarm condition group is closed. Since the grouping is purely time-based, there can only be one group at a time for a particular entity (such as a managed object of an individual network element 20).

With reference to FIG. 12, the method starts with detection of a new alarm condition A in step 1202. In a further step 1204 it is checked whether there already exists a group of alarm conditions to which the alarm condition A potentially belongs. If it is determined in step 1206 that there is already a running alarm grouping timer (that has not yet expired), then alarm condition A is added to this group in step 1210. Moreover, the alarm grouping timer is optionally updated (i.e., re-started). It is a matter of choice whether the alarm grouping timer always starts from detection of the first alarm condition of a new alarm group or if the alarm grouping timer is re-started upon detecting a new alarm condition while the alarm grouping timer is running. Still in step 1210, for each monitored performance indicator, the associated alarm clearance timer is optionally updated (i.e., re-started). It is generally a matter of choice whether the alarm clearance timer always starts upon detecting the first alarm condition of a particular alarm group or, in the alternative, if the alarm clearance timer is re-started upon detecting a new alarm condition still belonging to the ongoing alarm condition grouping process.

On the other hand, if it is determined in step 1206 that the new alarm condition A detected in step 1202 does not belong to an existing alarm group, a new alarm group is created having the new alarm condition A in it. Moreover, the alarm grouping timer is started and also an individual alarm clearance timer is started per performance indicator to be monitored. Additionally, the performance indicator value for the period of time preceding detection of alarm condition A is calculated as will be explained in more detail below with reference to FIG. 13. In analogy with FIGS. 8 and 9, this performance indicator value is denoted by KPI1.

The alarm grouping timer will be set to a period of time in which the alarm conditions grouped together are most likely due to the same root cause and a chance of coincidence (i.e., unrelated alarm conditions are accidentally close to each other in time) is comparatively low. It is also possible to set the alarm grouping timer to a value of 0. In such a case there will be no alarm condition grouping and each individual alarm condition will be an alarm group of itself. The condition checked in step 1206 of FIG. 12 will always be negative and only step 1208 will be carried out.

Moreover, the setting of the alarm grouping timer may also depend on the network element type implementing that timer. If, for example, the network element corresponds to access network node (e.g., an RBS, an NodeB or an eNodeB), failures are typically more localized and a larger value can be set. Highly aggregating nodes, such as core network nodes (e.g., MMEs), may have many unrelated alarm conditions at the same time. For this reason the alarm grouping timer should be set to a lower value or to 0 for such network elements.

As has been explained above, in various embodiments a key performance indicator value for a period of time preceding detection of an individual alarm condition or the start of a new alarm condition grouping procedure will be determined. This performance indicator value has also been denoted KPI1.

Figure 13:
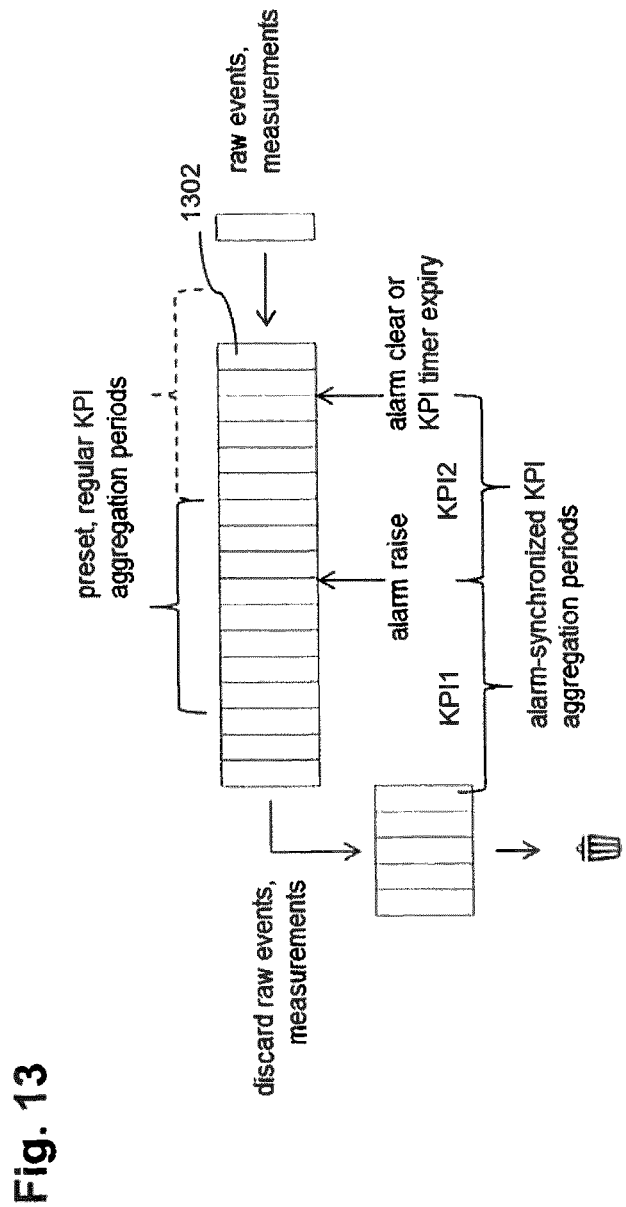
FIG. 13 shows an embodiment of determining a performance indicator value based on buffered data.

For determining KPI1, each network element 20 may comprise a buffer 1302 as illustrated in FIG. 13. The buffer 1302 may, for example, be implemented in the memory 26 of the network element 20 illustrated in FIG. 4. The buffer 1302 may be configured as a short-range event buffer in which event records as well as measurements to be aggregated for calculating a value for a particular performance indicator are temporally stored. In some cased, the measurements may constitute or be included in the event records. The measurements could also be determined from the raw events, or otherwise. FIG. 14 illustrates an example list of event records appearing in the short-range event buffer 1302 of FIG. 13.

As illustrated in FIG. 13, the buffer 1302 is continuously kept up-to-date, wherein old event records and measurements are continuously discarded as new event records and measurements are received and buffered. The length of the buffer 1302 may correspond to approximately one to two times of the regular aggregation period (as also illustrated in FIG. 3).

FIG. 13 specifically illustrates the event records and/or measurements from which the performance indicator value KPI1 and KPI2 are determined (see also FIGS. 8 and 9). As becomes apparent from FIG. 13, the aggregation periods underlying the calculations of KPI1 and KPI2 are synchronized with the lifespan of an individual alarm condition (or group of alarm conditions), up to a maximum period of time defined by expiry of the alarm clearance timer (again denoted KPI timer in FIG. 13).

FIGS. 15 to 17 show further flow charts 1500, 1600, 1700, respectively, with method steps that can be combined with any of the method embodiments discussed above, in particular the method embodiments of FIG. 12.

As shown in FIG. 15, upon detecting expiry of the alarm grouping timer in step 1502, the corresponding alarm condition group will be closed in step 1504. As a result, no further alarm conditions can be "attached" to that alarm group. Rather, upon occurrence of a new alarm condition, a new alarm condition group will be created (see step 1208 in FIG. 12).

With reference to FIG. 16, upon expiry of an individual alarm clearance timer for an individual performance indicator in step 1602 (see also step 206 in FIG. 7), the associated performance indicator value (e.g., KPI2 in the embodiments of FIGS. 8, 9 and 12) will be calculated in step 1604. Additionally, the associated alarm group (i.e., individual alarm conditions contained in the group) will be reported to the network management component 20 together with one or more performance indicator values (such as KPI1 and KPI2 in the exemplary scenario illustrated in FIG. 16). Assuming, for example, that KPI1 has already been calculated in step 1208, this means that in step 1604 the performance indicator value KPI2 will still need to be calculated before the reporting thereof.

An alternative of the procedure in FIG. 16 is illustrated in FIG. 17. Specifically, it may be detected in step 1702 that all alarm conditions within a particular alarm group have been cleared (see also step 206 of FIG. 7). The determination in step 1702 will typically precede expiry of the alarm clearance timer (see step 1602).

Once all alarm conditions within a particular alarm group have been found to be cleared, the alarm group is closed in step 1704. Additionally, one or more performance indicator values are calculated and reported to the network management component 10. Assuming, for example, that KPI1 has already been calculated in step 1208, this means that in step 1704 the performance indicator value KPI2 will be calculated. Then, KPI1 and KPI2 will be reported together with the alarm conditions in the associated alarm group.

Not all performance indicators are suitable for alarm impact assessment in the above embodiments. In accordance with the present disclosure, one or more performance indicators are either chosen for certain alarm types because they are clearly impacted by the signaled failure or because they are good to check normal operation in general. The impact may be determined as a sudden change in a regular flow of events, or as appearance of irregular events. Most of such performance indicators can be derived from the regular counters provided for network monitoring purposes at the network elements.

The one or more alarm conditions and the related one or more diagnostic performance indicators should be designed or selected together for each failure management subsystem (comprising, e.g., a particular network element type or group of network elements). Initial grouping of related alarm conditions is best done at network element (e.g., node) level as part of the self-diagnostics and self-healing process. Also the periods of time that the impact assessment performance indicators are computed over should be adjusted to the pre- and post-failure situation of the particular alarm condition or alarm condition group. Advanced failure management subsystems have primary and secondary alarm grouping already, and self-diagnostics can suppress further related/repeated alarm conditions if they do not carry extra information.

Many of the typical network performance indicators have high variability by nature, like the traffic volume or number of packets transmitted in a given time period. This is especially valid when network load is low. Therefore, such performance indicators are generally less suitable for the measurement of short-term impacts. Yet, for example, recording zero amounts of packets or bytes in a minute-long period after a failure may be statistically significant and hence can be interpreted as a sign of outage. Other performance indicators, e.g. the number of active users seen in a given period, are more stable, so they follow a daily profile better and a change in such performance indicators can indicate anomaly. Failures can cause a flood of alarm conditions and related events, and the network element itself can frame the time period when the number of dropped connections or handovers suddenly rises. On network management level, where such performance indicators are computed over 15 minutes, the sudden changes can be easily smeared out.

As has been explained with reference to exemplary embodiments, the present disclosure provides several individual improvements over existing failure management approaches. Such improvements include a more accurate comparison between a first period of time in which one or more alarm conditions are active and at least a further period of time preceding (and/or following) the first period of time. Also, alarm impact evaluation by a central network management component can in many implementations be performed faster. Further, certain operations such as alarm condition grouping and impact calculation can in certain cases be off-loaded from the central management component.

In the foregoing, principles, embodiments and various modes of implementing the present invention have exemplarily been described. However, the invention should not be construed as being limited to the particular principles, embodiments and modes discussed herein. Rather, it will be appreciated that various changes and modifications may be made by a person skilled in the art without departing from the scope of the present invention as defined in the claims that follow.

The invention claimed is:

1. A network element, comprising:
   processing circuitry;
   memory containing instructions executable by the processing circuitry whereby the network element is operative to:
   detect, as a first event, at least one alarm condition;
   in response to detecting the first event:
   set an alarm grouping timer to an alarm grouping timer value corresponding to an estimated period of time in which alarm conditions resulting from a common root cause occur; and start a first alarm clearance timer and the alarm grouping timer;

detect, as a second event, at least one of expiry of the first alarm clearance timer and clearance of the at least one alarm condition;

determine, after detecting the second event, a first performance indicator value of a performance indicator for a first period of time between the first event and the second event;

trigger reporting of:
 the at least one alarm condition; and
 at least one of the first performance indicator value and information derived from the first performance indicator value;

detect, as a fourth event, expiry of the alarm grouping timer;

prevent, in response to detecting the fourth event, a re-start of the first alarm clearance timer while the first alarm clearance timer is still running;

detect, as a fifth event, a further alarm condition while the first alarm clearance timer is still running; and start, in response to detecting the fifth event, a second alarm clearance timer running in parallel to the first alarm clearance timer.

2. The network element of claim 1, wherein the instructions are such that the network element is operative to determine at least a second performance indicator value for the performance indicator, wherein the second performance indicator value is determined for a second period of time preceding the first event.

3. The network element of claim 2:
wherein the instructions are such that the network element is operative to buffer data suitable for determining at least the second performance indicator value; and
wherein at least the second performance indicator value is determined from the buffered data.

4. The method of claim 2, wherein the instructions are such that the network element is operative to set a duration of the second period of time to a duration of one of:
 the first period of time;
 a setting of the first alarm clearance timer;
 a regular measurement aggregation period for the performance indicator.

5. The network element of claim 2, wherein the instructions are such that the network element is operative to trigger reporting of the second performance indicator value.

6. The network element of claim 2:
wherein the instructions are such that the network element is operative to determine an alarm impact indicator from at least the first performance indicator value and the second performance indicator value; and
wherein reporting of the alarm impact indicator is triggered.

7. The network element of claim 1, wherein the instructions are such that the network element is operative to determine at least a third performance indicator value for the performance indicator, wherein at least the third performance indicator is determined for a third period of time following the second event.

8. The network element of claim 1, wherein the instructions are such that the network element is operative to set the first alarm clearance timer to a first alarm clearance timer value corresponding to maximum expected lifetimes of possible alarm conditions detectable by the network element.

9. The network element of claim 1, wherein the instructions are such that the network element is operative to:

detect, as a third event, a further alarm condition while the alarm grouping timer and the first alarm clearance timer are running; and re-start, in response to detecting the third event, at least one of the first alarm clearance timer and the alarm grouping timer.

10. The network element of claim 9, wherein the instructions are such that the network element is operative to detect the second event upon all alarm conditions having occurred while:
 the alarm grouping timer is running; or
 the alarm grouping timer has been cleared; or
 the first alarm clearance timer has expired.

11. A network system comprising:
a network element; and
a network management component communicatively connected to the network element and comprising:
 processing circuitry;
 memory containing instructions executable by the processing circuitry whereby the network management component is operative to process:
  an alarm condition reported by the network element; and
  at least one of a first performance indicator value for a performance indicator and information derived from the first performance indicator value, as reported by the network element, wherein the first performance indicator value relates to a first period of time between a first event and a second event at the network element, wherein the first event is detection of the alarm condition and the second event is at least one of expiry of a first alarm clearance timer and clearance of the alarm condition;

wherein, in response to detecting the first event, the network element:
 sets an alarm grouping timer to an alarm grouping timer value corresponding to an estimated period of time in which alarm conditions resulting from a common root cause occur; and
 starts the first alarm clearance timer and the alarm grouping timer; and wherein the network element is further configured to:
 detect, as the second event, the at least one of the expiry of the first alarm clearance timer and the clearance of the alarm condition;
 determine, after detecting the second event, the first performance indicator value of the performance indicator for the first period of time between the first event and the second event;
 trigger reporting of:
  the at least one alarm condition; and
  the at least one of the first performance indicator value and the information derived from the first performance indicator value;
 detect, as a fourth event, expiry of the alarm grouping timer;
 prevent, in response to detecting the fourth event, a re-start of the first alarm clearance timer while the first alarm clearance timer is still running;
 detect, as a fifth event, a further alarm condition while the first alarm clearance timer is still running; and
 start, in response to detecting the fifth event, a second alarm clearance timer running in parallel to the first alarm clearance timer.

12. The network system of claim 11, wherein the instructions are such that the network management component is operative to process at least one of:
- a second performance indicator value for the performance indicator, wherein the second performance indicator value relates to a second period of time preceding the first event; and
- a third performance indicator value for the performance indicator, wherein the third performance indicator value relates to a third period of time following the second event.

13. The network system of claim 12, wherein the instructions are such that the network management component is operative to determine an alarm impact indicator from at least:
- the first performance indicator value; and
- one or both of the second performance indicator value and the third performance indicator value.

14. The network system of claim 13, wherein the instructions are such that the network management component is operative to process multiple alarm conditions and related alarm indicators, wherein the alarm indicators configure a prioritization of the processing of the alarm conditions by the network management component.

15. The network system of claim 11:
- wherein the instructions are such that the network management component is operative to process an alarm impact indicator reported by the network element;
- wherein the alarm impact indicator is based on the first performance indicator value and one or both of a second performance indicator value and a third performance indicator value;
- wherein the second performance indicator value relates to a second period of time preceding the first event; and
- wherein the third performance indicator value relates to a third period of time preceding the first event or following the second event.

16. A method of operating a network element, the method comprising:
- detecting, as a first event, at least one alarm condition;
- starting, in response to detecting the first event:
  - a first alarm clearance timer; and
  - an alarm grouping timer, wherein the alarm grouping timer is set to an alarm grouping timer value corresponding to an estimated period of time in which alarm conditions resulting from a common root cause occur;
- detecting, as a second event, at least one of expiry of the first alarm clearance timer and clearance of the at least one alarm condition;
- determining, after detecting the second event, a first performance indicator value of a performance indicator for a first period of time between the first event and the second event;
- triggering reporting of:
  - the at least one alarm condition; and
  - at least one of the first performance indicator value and information derived from the first performance indicator value;
- detecting, as a fourth event, expiry of the alarm grouping timer;
- preventing, in response to detecting the fourth event, a re-start of the first alarm clearance timer while the first alarm clearance timer is still running;
- detecting, as a fifth event, a further alarm condition while the first alarm clearance timer is still running; and
- starting, in response to detecting the fifth event, a second alarm clearance timer running in parallel to the first alarm clearance timer.

* * * * *